April 30, 1957 — C. A. KLEIN — 2,790,521
TOW BARS
Filed Jan. 28, 1953

INVENTOR.
Cletus A. Klein.
BY Learman & Learman
ATTORNEYS

United States Patent Office 2,790,521
Patented Apr. 30, 1957

2,790,521

TOW BARS

Cletus A. Klein, Caro, Mich., assignor to Max Hayman, Battle Creek, Mich.

Application January 28, 1953, Serial No. 333,737

5 Claims. (Cl. 188—112)

This invention relates to tow bars and more particularly to tow bars for interconnecting or coupling a pair of automotive vehicles in a manner to allow one to tow the other.

One of the prime objects of the invention is to design a new and improved tow bar of simple and substantial construction which is economical to manufacture and highly efficient in operation.

A further object of my invention is to provide simple and efficient means for automatically applying the brakes of the towed vehicle and eliminating the danger to life and equipment when a heavier towed vehicle tends to surge and overrun the towing vehicle, as when the brakes of the towing vehicle are applied on steep down grades, or when sudden jars and road shocks momentarily arrest or slow movement of the towing vehicle, allowing the towed vehicle to surge and crowd.

Still a further object of the invention is to provide dual purpose means which restrains the application of the brakes of the towed vehicle when it is undesirable to have the brakes applied by minor irregularities in the draft such as road irregularities and slight decreases in speed of the towing vehcile, and which speedily returns the brakes to inoperative position once the need for their application has passed.

Another object of the invention is to provide a tow bar which has both vertical and horizontal freedom of movement without imposing any strain on either the towing or towed vehicle.

A further object of the invention is to provide effective and reliable means for setting the frame arms of the tow bar in equilibrate, diverging relation to equalize the strain thereon and insure the uniform distribution of road shock and sudden jars, particularly when the towing vehicle is rounding a curve.

A still further object of my invention is to provide a tow bar which is readily adaptable for effective connection to automobile bumpers of diverse configuration and size, and which may be interconnected between any particular towing and towed vehicle with a minimum of effort and adjustment.

Other objects and advantages of the invention will be apparent from the following description and the accompanying drawing, in which similar characters of reference indicate similar parts throughout the several views.

Figure 2:
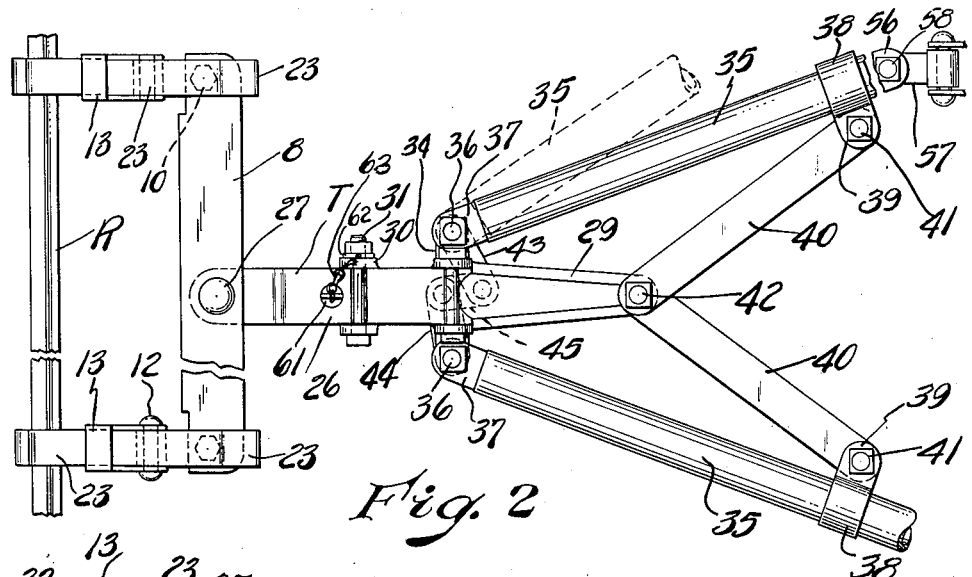
Fig. 2 is a top plan view thereof.
Figure 1:
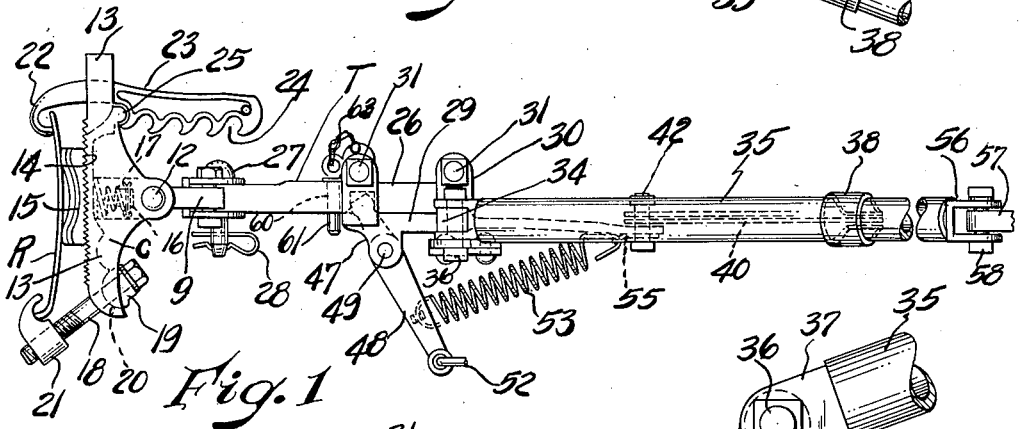
Fig. 1 is a side elevational view of my tow bar showing it connected to the rear bumper of a towing vehicle, the rear portion of the tow bar being broken away and the front bumper of the towed vehicle being omitted.
Figure 4:
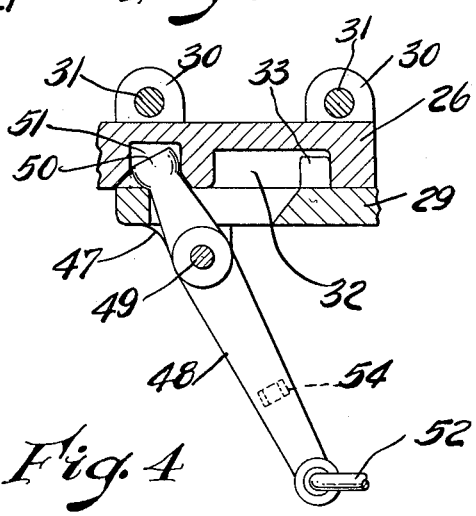
Fig. 4 is an enlarged, fragmentary, sectional view showing the draw bar, coupling member and brake lever mechanism.

Referring now more particularly to the accompanying drawing wherein I have shown the preferred embodiment of my invention, the letter T generally indicates my tow bar which includes a transversely disposed, channel-shaped bar 8 having bumper clamp arms 9 pivotally secured thereto by means of bolts 10, and these clamp arms are pivotally secured to bumper clamps C by means of rivets 12, the clamps C being in turn connected to the rear bumper R of a towing vehicle (not shown). These clamps C are readily adjustable to fit bumpers of various configurations and form the subject matter of application Serial No. 339,029 filed February 26, 1953, now Patent 2,726,880, and I therefore do not deem it necessary to show and describe them in detail. Broadly, however, each of the clamps C comprises a vertically disposed, channeled support member 13, the outer face of which is serrated as at 14 to support a vertically adjustable, similarly serrated bumper-engaging plate 15. The plate 15 is formed with an inwardly projecting post 16, and a coil spring 17 is mounted thereon and bears against the interior wall of the member 13 to retain the plate 15 in position. A bolt 18 having a hemispherical rocker member 19 mounted thereon, is accommodated in one of the sockets 20 in the support member 13, and a hook member 21 is threaded on the bolt 18 for engagement with the lower edge of the bumper R.

The upper edge of the bumper R is engaged by a hook 22 which is formed on the upper clamping member 23, said member being formed with a plurality of longitudinally spaced sockets 24, one of which is rockably mounted on the rounded rib 25 formed in the member 13. Both of the clamping members 18 and 23 extend through suitable openings, (not shown) provided in the support 13, and it will be obvious that the pairs of clamps C are readily adjustable for clamping on bumpers of desired configuration and dimension and can be quickly clamped in place with a minimum of effort and adjustment.

A rearwardly extending draw bar 26 is pivotally connected to the cross bar 8 by a kingpin 27 which is secured by a cotter pin 28, and a coupling member or yoke 29 is slidably mounted in facial contact with the lower face of the bar 26, pairs of transversely spaced, upstanding lugs 30 being formed integral with the coupling member which are provided with aligned openings (not shown) therein to accommodate the spanning bolts 31. The pairs of lugs 30—30 slidably accommodate the draw bar 26 therebetween, and the bolts 31 prevent vertical displacement of the coupling member 29 with respect to the draw bar 26.

The rear portion of the draw bar 26 is formed with an elongated recess 32 in its lower face, and a lug 33 is formed on the upper face of the coupling member 29, and is accommodated in the recess 32, said recess being of predetermined length to permit the coupling member 29 to slide longitudinally with respect to the draw bar 26, all as will be hereinafter more fully described.

Laterally projecting ears 34 are formed on the coupling member 29 at a point intermediate its length, and rearwardly diverging arms or members 35—35 are pivotally secured thereto by means of bolts 36, said arms, in the instant application, comprising standard pipe sections having clevis members 37 welded on the inner ends thereof as shown, but it will be clearly understood that they may be formed in any other desired manner.

An adjustable circular strap collar 38 formed with parallel end sections 39, embraces and is clamped on each diverging arm 35, and one end of an arm brace 40 is pivotally connected to each of the sections 39 by means of a bolt 41, and the opposite end of the braces 40 being pivotally connected to the rear end of the coupling member 29 by means of the bolt 42, all as clearly shown in Fig. 2 of the drawing.

Figure 3:
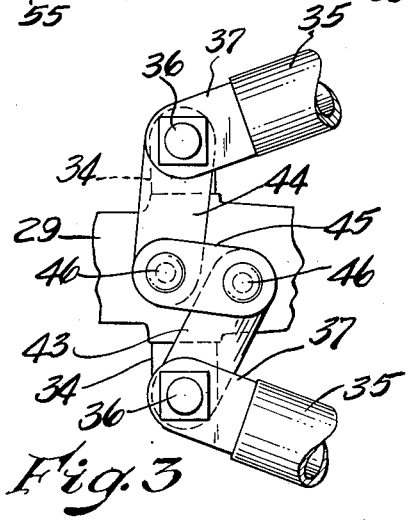
Fig. 3 is an enlarged, fragmentary, sectional, inverted plan view of the equalizing linkage, which insures that the frame arms will always be set in equilibrate, diverging relation.

Laterally projecting, inwardly extending equalizer arms 43 and 44 are rigidly provided on the clevis members 37 as clearly shown in Fig. 3 of the drawing, and I wish to direct particular attention to the fact that the equalizer arm 43 projects inwardly at a more acute angle than does the equalizer arm 44, and a link 45 connects said equalizer arms by means of rivets 46—46, this link 45 being substantially longitudinally disposed between the free ends of the equalizer arms 43 and 44 when the diverging arms 35 are in their least divergent position. This arrangement of the equalizer arms 43—44 and link 45 permits the divergent arms 35 to be first set or adjusted to desired diverging position, after which the bolts 41 are tightened to clamp the straps 38 firmly in position.

When the bolts 41 are loosened and one frame arm 35 is moved inwardly or outwardly, it will be apparent that the other frame arm will likewise be moved inwardly or outwardly as the case may be, the linkage system made up of the equalizer arms 43—44 and link 45 serving at all times to maintain the frame arms 35 in equilibrium, so that when the bolts 41 are tightened down and the arms 35 "set," the road shock and pulling stresses are always apportioned.

Spaced-apart, depending lugs 47 depend from the underside of the coupling member 29, and a brake lever 48 is pivotally secured thereto at a point interjacent its ends by means of the pin 49, the upper end 50 of said lever being rounded as shown and extending into a recess 51 provided in the lower face of the pull bar directly ahead of the recess 32. A cable 52 is connected to the lower end of the brake lever, leading thence to the brake pedal of the drawn vehicle (not shown), and it is obvious that when the coupling member 29 slides longitudinally with respect to the draw bar 26, as when the brakes of the towing vehicle are suddenly applied or when traveling down hill, the towed vehicle will surge forwardly, the member 29 sliding on the tow bar 26, thus swinging the brake lever 48 and applying the brakes on the towed vehicle.

To speedily return the brake lever to inoperative position and restrain it from being actuated forwardly by inconsequential jars or changes in the relative speed of the vehicles, a coil spring 53 is connected between an eye 54 on the brake lever 48 and a bracket plate 55 mounted on the bolt 42.

Clevises 56 are welded to the rear ends of the frame arms 35, and link arms 57 are pivotally connected thereto by means of bolts 58, the opposite ends of the links being connected to the bumper clamps which secure the front bumper of the towed vehicle (not shown). The clamps are identical with those utilized for connecting the tow bar to the bumper R and which have been previously described.

When backing the vehicle, it is desirable to prevent the member 26 from moving rearwardly relative to the member 29 and thus applying the brakes on the towed vehicle, and a passage 60 is therefore provided through the member 26 adjacent the forward end of the member 29 in which a back-up pin 61 may be inserted to engage the member 29, and a washer 62 is mounted on the bolt 31 and a chain 63 connects said back-up pin and washer.

In operation, the tow bar is dependable and efficient, the braking lever 48 being automatically actuated to apply the brakes of the towed vehicle whenever the surging of the towed vehicle or sudden slowing of the towing vehicle causes the coupling member 29 to overcome the resistance of the spring 53 and slide longitudinally forward with relation to the draw bar 26. The towed vehicle is thus prevented from crowding and overtaking the towing vehicle with the resultant danger to life and equipment and the breakage or fracturing of the tow bar mechanism.

What I claim is:

1. In a tow bar for interconnecting a towing vehicle and a vehicle to be towed thereby, means for removable attachment to the rear bumper of a towing vehicle, a draw bar extending rearwardly therefrom, a coupling member mounted to slide longitudinally with relation to said draw bar, means on said coupling member to engage said draw bar and limit longitudinal movement of said coupling member with relation to said draw bar, a brake arm in engagement with said draw bar and pivotally mounted on said coupling member to swing in a longitudinal plane when actuated by movement of the coupling member with relation to the draw bar, means connecting said brake arm and the brakes of the drawn vehicle to apply said brakes when said brake arm is swung forwardly, a pair of relatively adjustable frame arms diverging rearwardly from said coupling member, inwardly extending, oppositely disposed means fixed on said frame arms, an equalizing member pivotally connected between said means and maintaining said frame arms in uniformly divergent relation, and means pivotally mounted on the rear ends of said frame arms for removable attachment to the front bumper of the vehicle to be drawn.

2. The combination as defined in claim 1 in which said means extending inwardly from said frame arms comprises an equalizer arm extending inwardly from each frame arm at a different angle relative to said frame arms, and said equalizer member is pivotally connected to the ends of said equalizer arms.

3. In a tow bar for interconnecting a towing vehicle and a vehicle to be drawn thereby, means for removable attachment to the rear bumper of a towing vehicle, a draw bar extending rearwardly therefrom, a coupling member, frame arms connected to said coupling member, means on the rear ends of said frame arms for removable attachment to the front bumper of a vehicle to be towed, inwardly extending, oppositely disposed equalizer arms rigid on said frame arms adjacent the points of connection of said frame arms to said coupling member, and an equalizer link pivotally connecting said equalizer arms to maintain said frame arms in uniform divergent relation, said equalizer arms being pivotally secured to opposite ends of said equalizer link.

4. The combination as set forth in claim 3 in which said frame arms are formed of pipe sections, and laterally projecting equalizer arms are rigidly provided on the lower forward ends thereof, said frame arms pivotally connecting with the coupling member, one of said equalizer arms being disposed at a more acute angle with relation to its body frame arm than the other equalizer arm with relation to its body frame arm.

5. In a tow bar for interconnecting a towing vehicle and a vehicle to be towed thereby, means for removable attachment to the rear bumper of the towing vehicle, a draw bar pivotally mounted thereon and extending rearwardly therefrom, a coupling member slidably mounted on said draw bar, transversely spaced upright lugs on the sides of said coupling member and transversely disposed bolts spanning said draw bar, said draw bar being formed with a longitudinally extending recess in its undersurface, a lug on said coupling member of less longitudinal dimension than said recess extending thereinto and movable longitudinally therein to determine the limits of relative movement of the coupling member and draw bar, a passage in said coupling member, depending lugs adjacent said passage, a brake arm extending through said passage and pivotally connected to said lugs at a point intermediate its length to swing in a horizontal plane, said draw bar being formed with a second recess in its undersurface with the one end of the brake lever closely and rockably accommodated therein, and flexible means connecting the lower end of the brake lever to the brakes of the towed vehicle so that relative movement of said coupling member and draw bar actuates said brake arm to apply said brakes on the towed vehicle when the free end of said brake arm is swung forwardly, resilient means connecting said brake arm and said coupling member to swing said brake arm to inoperative position and release said brakes, rearwardly diverging frame arms pivotally secured to said coupling member for attachment to the towed vehicle.

References Cited in the file of this patent

UNITED STATES PATENTS

| | | |
|---|---|---|
| 962,442 | Linton | June 28, 1910 |
| 1,559,541 | Ballentine | Nov. 3, 1925 |
| 2,040,728 | Bulmer | May 12, 1936 |
| 2,113,262 | Zagelmeyer | Apr. 5, 1938 |
| 2,114,279 | Claus | Apr. 19, 1938 |
| 2,309,204 | Nelson | Jan. 26, 1943 |
| 2,340,273 | Phillips | Jan. 25, 1944 |
| 2,428,226 | Jones | Sept. 30, 1947 |
| 2,562,008 | Williams | July 24, 1951 |

FOREIGN PATENTS

| | | |
|---|---|---|
| 270,998 | Great Britain | May 19, 1927 |